United States Patent
Haass

(10) Patent No.: US 6,246,192 B1
(45) Date of Patent: Jun. 12, 2001

(54) ELECTRONIC DRIVE SYSTEM

(76) Inventor: Adolf Haass, Eichelhaherstrasse 54, D-81249 Munich (DE)

( * ) Notice: Subject to any disclaimer, the term of this patent is extended or adjusted under 35 U.S.C. 154(b) by 0 days.

(21) Appl. No.: 09/424,287

(22) PCT Filed: May 22, 1998

(86) PCT No.: PCT/EP98/03053

§ 371 Date: Mar. 2, 2000

§ 102(e) Date: Mar. 2, 2000

(87) PCT Pub. No.: WO98/54830

PCT Pub. Date: Dec. 3, 1998

(30) Foreign Application Priority Data

May 28, 1997 (DE) ............................................. 197 22 453

(51) Int. Cl.$^7$ ...................................................... H02P 7/67
(52) U.S. Cl. ............................................................ 318/112
(58) Field of Search ................................... 318/111, 112, 318/113

(56) References Cited

U.S. PATENT DOCUMENTS

| | | | |
|---|---|---|---|
| 4,263,535 | * 4/1981 | Jones ........................................ | 318/87 |
| 4,289,997 | * 9/1981 | Jung et al. ............................. | 318/113 |
| 4,644,232 | * 2/1987 | Nojiri et al. ............................ | 318/66 |
| 4,774,441 | * 9/1988 | Toyomasu et al. ................... | 318/102 |
| 4,825,133 | * 4/1989 | Tanuma et al. ....................... | 318/113 |
| 4,918,365 | 4/1990 | Tanuma et al. . | |
| 5,162,709 | 11/1992 | Ohi . | |
| 5,270,632 | 12/1993 | Hirota et al. . | |
| 5,534,758 | * 7/1996 | Yamamoto et al. ................... | 318/112 |
| 5,739,648 | * 4/1998 | Ellis et al. ............................. | 318/112 |
| 6,121,735 | * 9/2000 | Igeta et al. ............................ | 318/101 |

FOREIGN PATENT DOCUMENTS

| | | |
|---|---|---|
| 0 256 769 | 2/1988 | (EP) . |
| 0 275 992 | 7/1988 | (EP) . |
| 0 500 948 | 9/1992 | (EP) . |

OTHER PUBLICATIONS

Patent Abstracts of Japan; vol. 005, No. 121 (E–068), Aug. 5, 1981 & JP56058794 A (Fuji Electrochem Co Ltd), May 21, 1981—see abstract.

Patent Abstracts of Japan, vol. 095, No. 001, Feb. 28, 1995 & JP06296398A (Topcon Corp), Oct. 21, 1994—see abstract.

* cited by examiner

Primary Examiner—Bentsu Ro
(74) Attorney, Agent, or Firm—Fish & Richardson P.C.

(57) ABSTRACT

In an electrical drive system an increased electromagnetic compatibility is achieved by used of AC rotating motors having no commutator and no slip rings as driving motors, whereby a simplified structure of the drive system and of the control of the drive is achieved in that, particularly plural phased stator windings of the AC motors are pulsewise controlled by use of plural channel control whereby the rotation speed of the respective rotating magnetic field of the AC motors is controlled.

13 Claims, 6 Drawing Sheets

ELECTRONIC DRIVE SYSTEM

Figure 1:
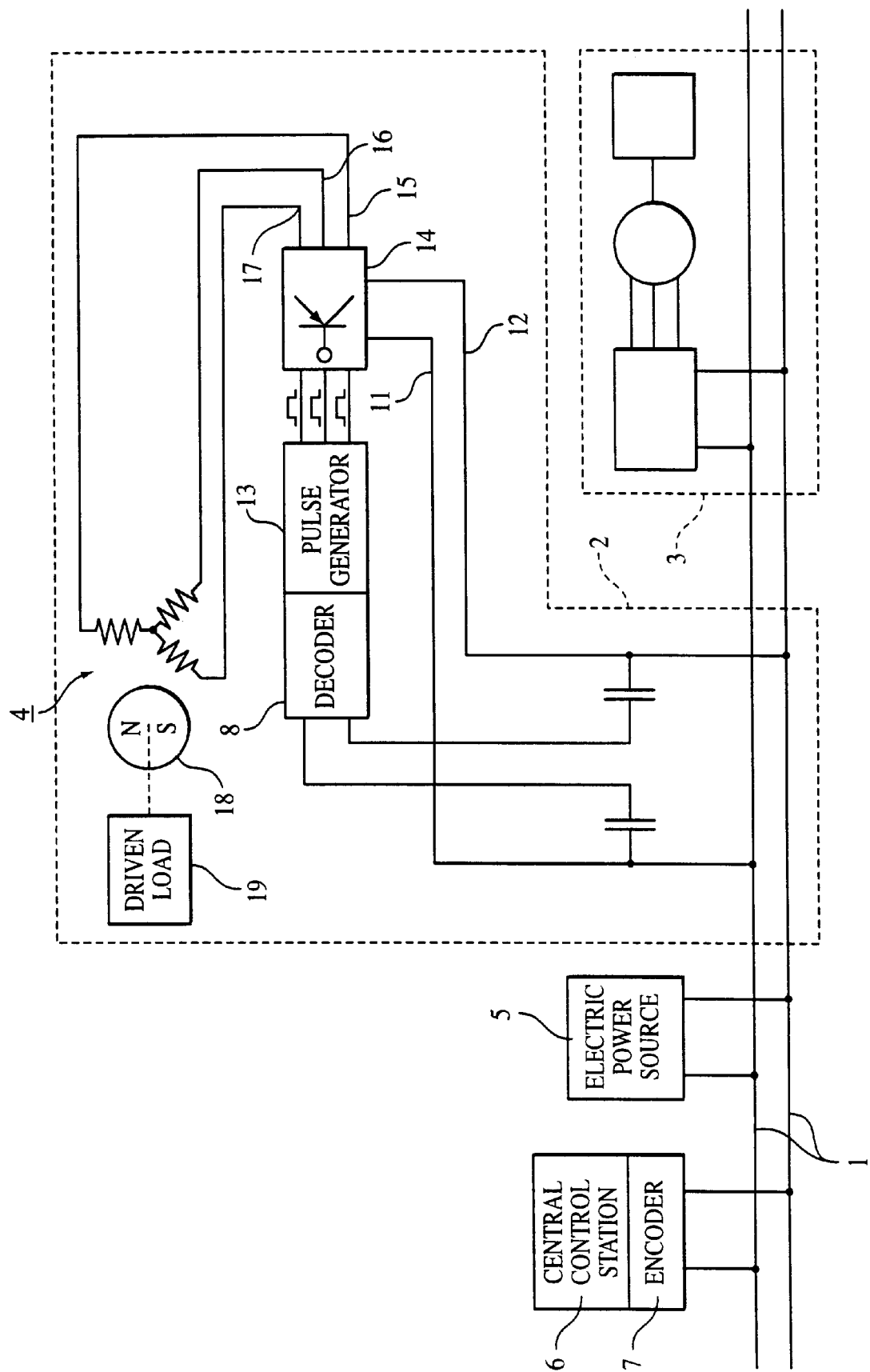

The invention concerns to electrical drive systems with a plurality of differently located AC motors having no slip rings nor commutators, the respective stator of said AC motors being designed so that it is adapted to generate a rotating magnetic field, furthermore with an electrical line network for supplying electrical energy from a power source to said AC motors, and with a control system comprising control units respectively allocated to said AC motors. Such electrical drive systems are located e. g. on large machines having a multitude of asynchronous drive motors for band conveyors which, for avoiding jams of conveyed articles, have to be switched on and switched off, respectively in predetermined sequence.

However, in case that an electrical drive system comprises a plurality of differently located motors which, for fulfilling their driving function, each need a speed control or a speed control with feedback, one uses regularly DC motors or universal motors the speed of which is controllable by controlling the terminal voltage, said DC motors or universal motors, because of the slip rings or commutators necessary for supplying current to the rotor, are comparatively expensive and, moreover have the drawback of sparking occurring at the slip rings or commutators, with this sparking causing interferences in a very broad frequency band and, thus, being in contradiction with the requirements of electromagnetic compatibility (EMC). Shielding of the interferences induced by slip ring or commutator sparking causes considerable problems as these interferences also invade the entire line system which then acts as an antenna for interference signals.

With known electrical drive systems of the kind defined before at the beginning having diverse AC motors as driving motors and wherein the driving motors fulfil remarkably different driving functions, it is moreover necessary that the control system comprises control units of correspondingly different design allocated to the respective AC motors, whereby, if such control units, in turn, are to be centrally controlled, a rather complicated system of control lines has to be installed between the central control station and the particular control units substantially parallel to the line network serving for supply of the electric energy.

This system of control lines for an electrical drive system with numerous electrical actuators, as far as such actuators are located in comparatively small distances on a frame or a supporting structure, is commonly implemented as a cable harness which is attached to the housing or supporting platform as a part to be handled during assembling, and causes high expenditure of labour and cost with its production, its assembly and its electrical connection to the central control station on the one side and to the particular control units for the actuators or drives, on the other side.

Control line systems of this known type, moreover, are sensitive to interference, tend to rupture of particular line wires under vibration and, with line defect caused malfunction of the motors to be controlled, can lead to severe malfunctions of the whole drive system.

In consideration of this state of the art it is an object to be achieved by the invention to design an electrical drive system of the general kind as defined above at the beginning in such manner that, with comparatively simple structure of a control system having control units allocated to a number of AC motors fulfilling different drive functions, the electromagnetical compatibility is ensured and brake-downs are avoided.

This object, in accordance with the invention, is achieved by the features of the characterising part of patent claim 1.

Advantageous further developments and embodiments of the electrical drive system defined in patent claim 1 are subject matter of the patent claims following claim 1.

The concept underlying the invention substantially is to supply control signals from the central control station to the AC motors via a line network which, coincidentally, is the energy supply network, whereby said control signals are not merely the conventional switch on signals and switch off signals for actuation of motor switches or the like but directly take influence on generation of the rotating magnetic field of the stator windings of the AC motors. Independent from whether the electrical line network of the electrical drive system presently disclosed is supplied with DC or AC the particular AC motors can be allocated respectively to the universal control units which, despite of respectively equal structure, can control AC motors of different power, different range of operating speed and different stator winding design. A cable harness connecting particular AC motors and the corresponding control units to a central control station need not be installed.

It is noted here generally that, while in the following description of embodiments the use of synchronous motors as AC motors having no slip rings and no commutators is demonstrated, the present invention comprises also the use of asynchronous motors with short circuit rotor as well as the use of motors of special design as split-phase machines. It is of significance that the motors suggested here for the drive system have no slip rings nor commutators and include a stator the stator winding of which is adapted to generate a rotating magnetic field. If the speed of the rotating field, as it is the case with use of asynchronous rotors, does not correspond with the rotor speed, it is obligatory in the system presently suggested to control the speed of the rotating magnetic field by the central control station, controlling the rotor speed for some drive functions, particularly for realising a desired start-up characteristic. Such speed controlling does not cause substantial difficulties since the operation of the AC motors having no slip rings and no commutators as used in the present case, is anyhow not dependent from the frequency of the current source, which in the system presently disclosed can be optionally a DC source or a AC source having a AC frequency as used internationally.

Figure 2:
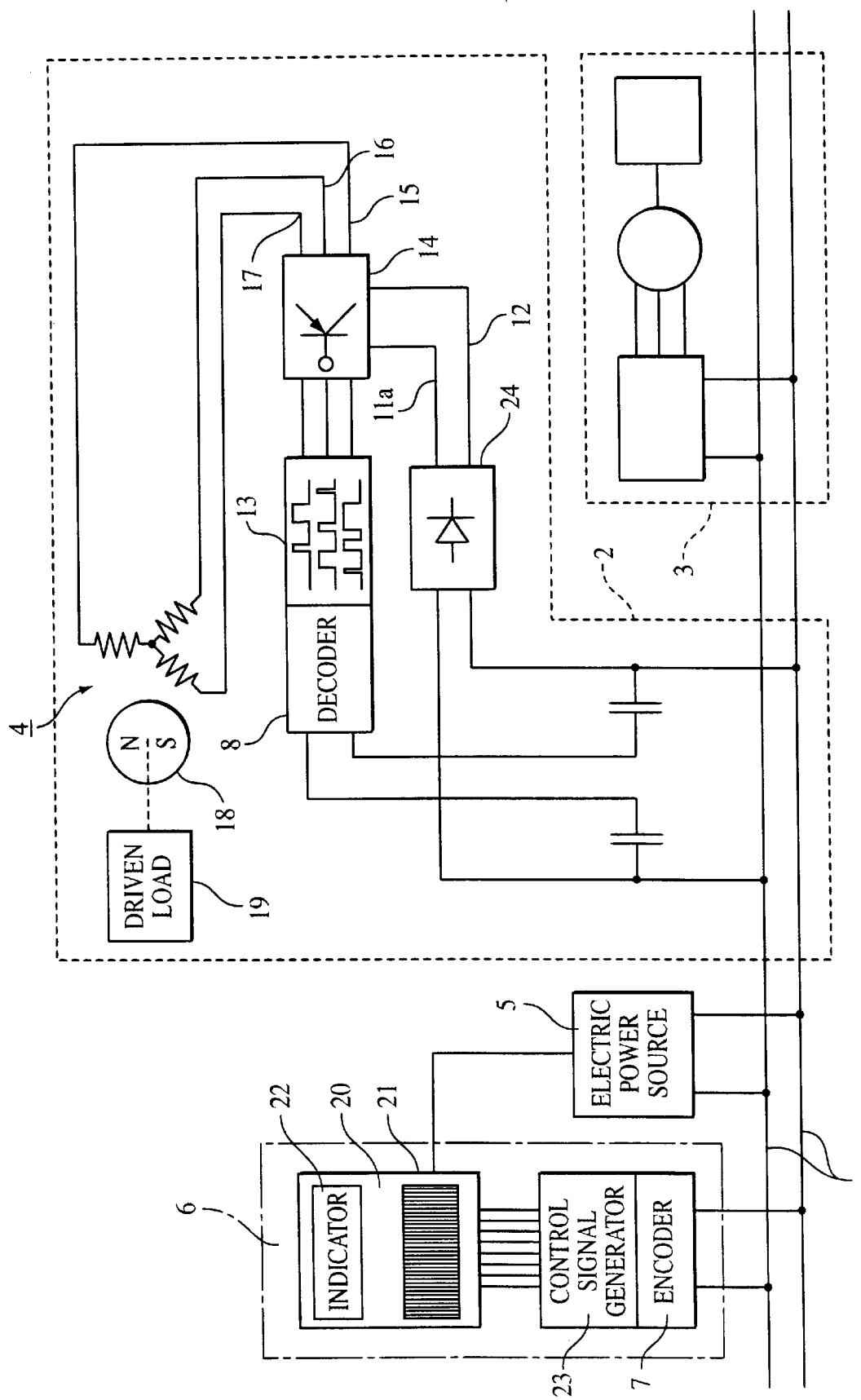
Figure 3:
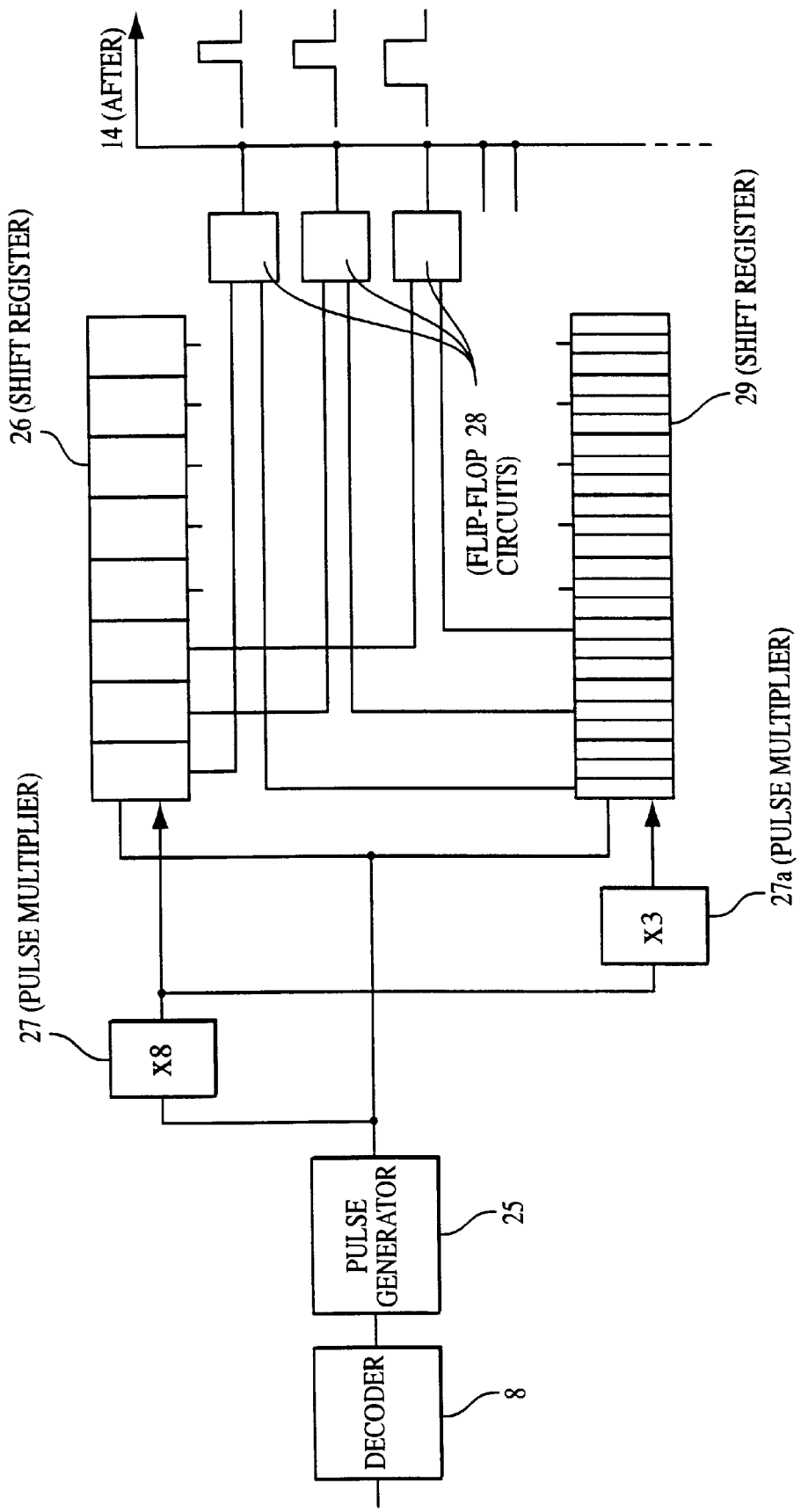
Figure 4A:
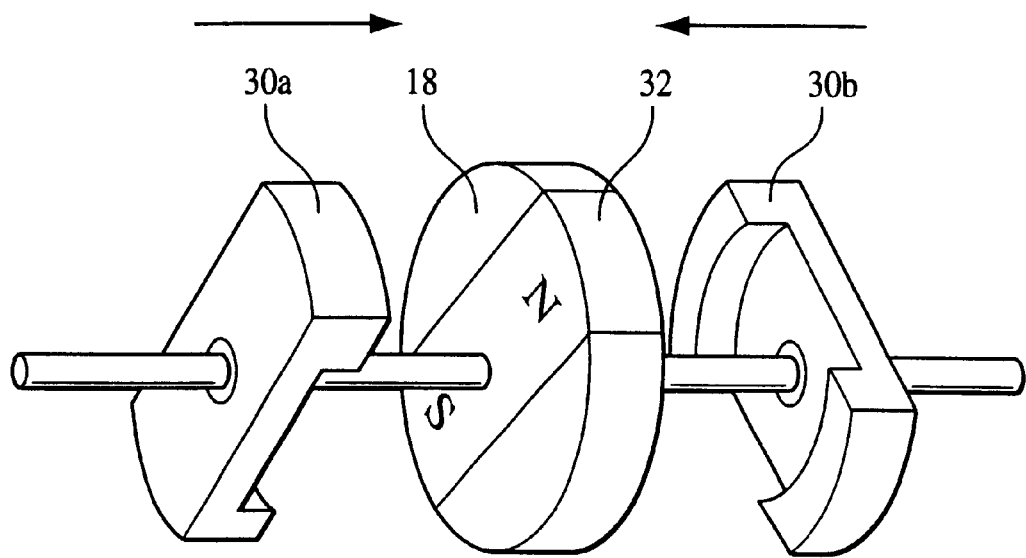
Figure 4:
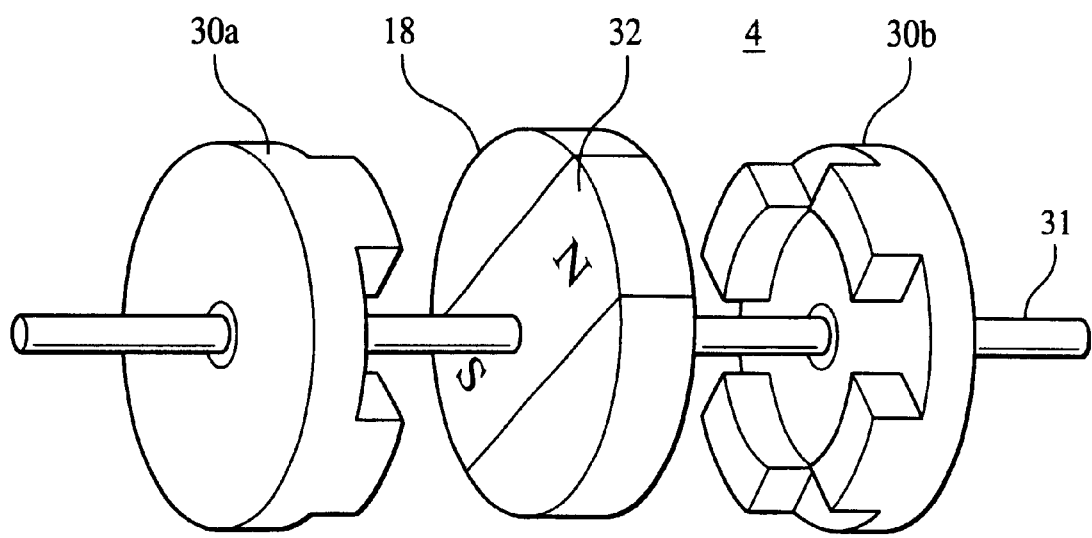
Figure 5:
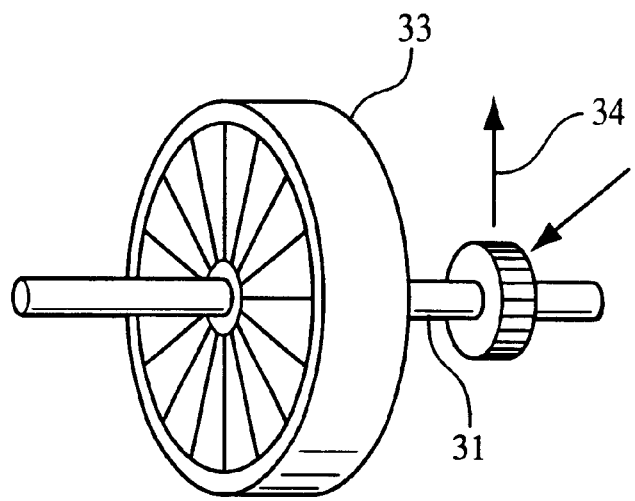
Figure 6:
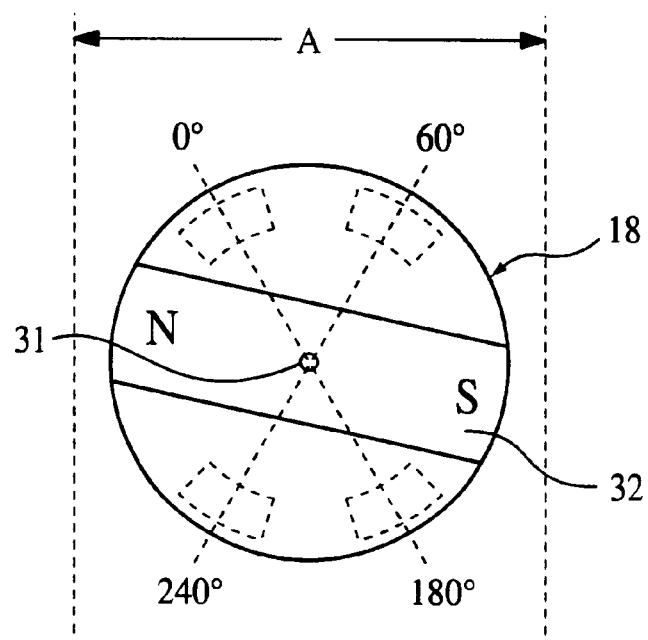
Figure 7:
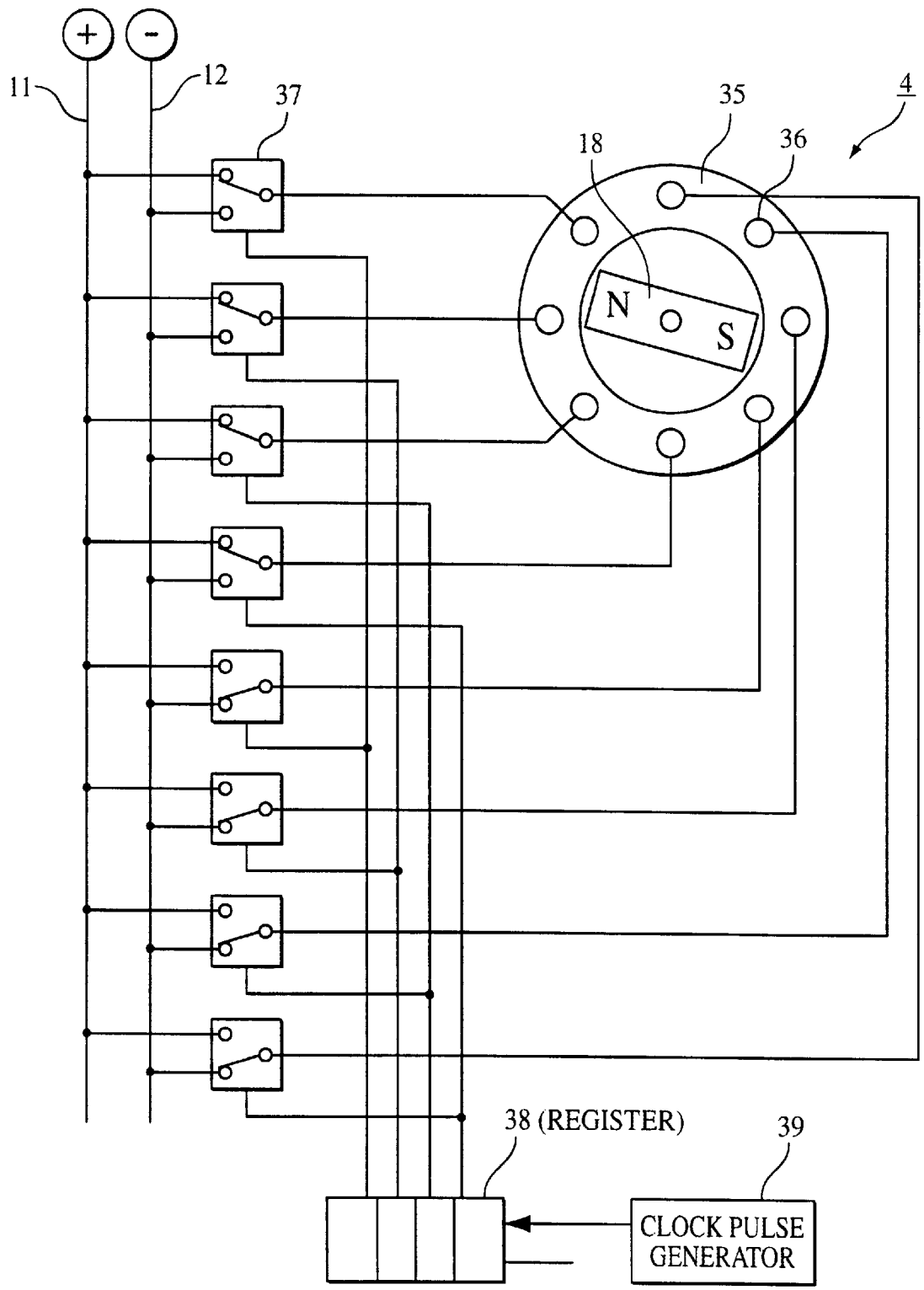

Herebelow embodiments and particular developments of the proposed system and part thereof shall be described by reference to the drawing. The following is shown in:

FIG. 1 an electrical drive system in simplified form and in schematic representation, FIG. 2 a schematic representation of an embodiment further developed in comparison with FIG. 1, FIG. 3 a schematic circuit diagram of a pulse generator unit usable in the system in accordance with FIG. 2, FIG. 4 a schematic perspective representation of a synchronous motor usable in a system of the kind presently disclosed with the parts thereof being shown drawn apart in the direction of the drive shaft, FIG. 4a in a similar representation, an embodiment of a synchronous motor modified in comparison with FIG. 4, FIG. 5 a perspective view of a cage rotor usable in combination with stator parts in accordance with FIG. 4 or 4a for formation of an asynchronous motor, FIG. 6 a schematic view of the rotor of the synchronous motors of FIG. 4 or 4a indicating the stator poles, and FIG. 7 a schematic view of a synchronous motor, the stator winding of which may be controlled in correspondence with the operation of a stepping motor.

In the drawings, respective corresponding parts of the shown embodiments are provided with identical reference symbols.

The electrical drive system in accordance with FIG. 1 comprises a line network 1 and drive units 2, 3, e.t.c., which each include a AC motor 4 not having slip rings nor a commutator. Connected to the line network 1 is an electric power source 5 which, with the embodiment of FIG. 1, is a DC power source. Additionally, a central control station 6 is coupled to the line network 1. This central control station serves for supplying control signals for the drive units 2,3, e.t.c. and for further consumous connected to the line network as lightings, signal generators and the like. Blocking circuits for keeping the voltage of the power source 5 away from the central control station 6 and for keeping away the signals of the central control station 6 from the power source 5 have been omitted in the drawing for the purpose of simplified representation. It should further be noted that the power source 5 and the central control station 6 may also be combined in an apparatus unit in such a manner that a supply voltage having control signals modulated onto it is supplied to the line network 1 via one single supply line, but in the present case a separate representation has been chosen for reasons of clarity.

The central control station 6 includes an encoder 7 for encoding the control signals for control signal receivers connected to the line network 1 in such a way that decoders 8, provided at the side of the control signal receivers, are capable of extracting the control signals intended for the respective control signal receiver. Relevant details are known to the person having skill in the art and do not require a detailed description.

The drive units 2,3 pick up the DC voltage of the voltage source 5 and also the control signals of the central control station 6 provided at the line network 1 so that the DC voltage and the control signals is available on lines 11 and 12.

Via an extraction network, which as a general rule is comprised of resistors or capacitors, there is connected to lines 11 and 12 the decoder 8, which extracts the control signals intended for e. g. the drive unit 2 and feeds them to a pulse generator 13, the output lines of whichs, in the schematically indicated manner, supply rectangular wave, or square wave, switching pulse sequences which are phase-shifted related to each other by 120° in relation to the full pulse period. The pulse frequency of the output pulse sequences of the pulse generator unit 13 is dependent on the control signals generated by the central control station 6, encoded by the encoder 7 and finally extracted and decoded by the decoder.

The switching pulse sequences generated by the pulse generator unit 13 subsequently arrive at a DC/AC converter 14 which is connected to the lines 11 and 12 conveying the direct voltage of the power source 5, and which transforms this direct voltage by means of three controllable valves into a three-phase AC voltage which is output onto the lines 15, 16 and 17. The voltages on the lines 15, 16 and 17 each, approximately, have a rectangular wave shape as far as the idling conditions are concerned.

To the lines 15, 16 and 17, the three phases of a three-phase stator winding of the motor 4 are connected, with these three phases having a star connection configuration in the present embodiment. The rotor 18 associated with the stator has the form of a synchronous machine magnet wheel, the shaft of which is coupled with a driven load 19.

The pulse frequency of the output pulse sequences of the pulse generator unit 13 of the output pulse sequences of the pulse generator unit 13 determines the rotary speed of the rotary field generated by the stator of the synchronous motor 4 and thus the rotary speed of the rotor 18 in a clearly defined association.

In the embodiment described in connection with FIG. 1, the single phases of the stator winding are excited substantially by rectangular-wave type currents, for which reason the rotary field generated by the stator of the electromotor 4 is relatively inhomogeneous. This inhomogeneity may be eliminated by controlling the single phases of the store winding of the motor 4 by a plurality of pulses modulated in their pulse width, which shall be treated in more detail further below.

It may, however, also be desirable to modify the amplitude of the current waves flowing through the lines 15, 16 and 17 in dependence on the rotary speed of the rotary field to be generated, for example in order to reliably realise a specific starting behavior of the synchronous motor 4 even in the case of an increased starting resistance of the driven load 19. In this case, when the valves of the DC/AC converter 14 are not operating in the saturation range, increased amplitudes of the current waves on the lines 15, 16 and 17 may be obtained by correspondingly greater switching pulses at the output of the pulse generator unit 13 which is influenced correspondingly for this purpose by additional control information from the central control station 6.

In the representation of an embodiment according to FIG. 2 further developed in comparison with FIG. 1, details of the central control station 6 are indicated. The latter contains a control panel 20 having a keyboard 21 for manually inputting particular control instructions, as well as indicator means 22 for reproducing acknowledgements by consumers connected to the line network 1, wherein details of the signal paths for return conveying of the acknowledgement signals or acknowledgement information being omitted in the present description and in the drawings for the sake of simplicity of representation.

The control panel 20 is connected via a number of signal lines to control signal generating means 23 which contain pulse generators, analogue/digital converters as well as multiplexing means and the encoder 7 mentioned above.

In the embodiment according to FIG. 2, the current source 5 has the form of an AC current source which may be turned on and off and amplitude controlled from the control panel 20.

In each of the drive units 2 and 3, which may be connected to the line network 1 just like in the embodiment according to FIG. 1, there is located a rectifier circuit 24 for transforming the AC voltage of the AC current source 5 into a direct voltage provided on output lines 11a and 12a of the rectifier circuit 24. This direct voltage, in a manner similar to the one in the embodiment according to FIG. 1, is supplied to a DC/AC converter 14 delivering on the output side, to lines 15, 16 and 17, AC voltages which are phase-shifted by 120° relative to each other and which excite in the three phases of the stator winding of the synchronous electrical motor 4 correspondingly phase-shifted magnetic fields that result in a rotary field acting on the magnet wheel 18 of the synchronous motor 4.

Deviating from the embodiment according to FIG. 1, however, the pulse generator unit 13 of the embodiment according to FIG. 2 is formed such that it supplies to the DC/AC converter 14 not only rectangular-wave switching signals phase-shifted relative to each other by 120 electrical degrees, but in the manner of the operation of a switching controller supplies via three switching pulse lines a plurality of pulses having various pulse durations to the DC/AC converter 14, i.e. to the controllable electrical valves located therein, within one period of the AC voltage to be generated. Sequence and duration of the respective supplied switching pulses is selected such that the electrical valves of the DC/AC converter 14 are controlled open within the period of an alternating current to be generated such that the time integral over the pulse sequence, in relation to the level of the respective direct current mean value, approximates a sinusoidal oscillation.

By excitation of the three-phase stator winding of the synchronous motor 4 one thus obtains a comparatively harmonious rotary magnetic field.

The period of the sequence of output pulses of the pulse generator unit with a pulse duration variably selected in order to approximate a sinusoidal oscillation of the currents on lines 15, 16 and 17 is adjusted by a control instruction signal of the central control station 6 extracted by the decoding means 8 for the pulse generator unit. This control instruction signal thus determines in a comparatively simple form the shapes and mutual associations of a multitude of control pulses at the output of the pulse generator unit 13, without a multitude of control signal transmission channels having to be provided on the way from the central control station 6 to the drive units 2, 3, e.t.c.

FIG. 3 shows a possible form of a part of the pulse generator unit 13 for the embodiment according to FIG. 2.

The decoder 8 supplies to a pulse generator 25 control signals which determine the pulse-repetition frequency of the output pulses of the pulse generator 25. The pulse generator 25 supplies at its output a pulse sequence having a pulse-repetition frequency corresponding to the rotary frequency of the rotary magnetic field to be generated by the stator of the synchronous motor 4. These output pulses of the pulse generator 25 activate a shift register 26, the clock input of which is supplied for progressing the input signal through the stages of the register from the output of the pulse generator 25 via a pulse multiplier 27. In the selected example, which merely serves for qualitative explanation, the pulse-repetition frequency of the pulse multiplier 27 is the eightfold of the pulse-repetition frequency of the output of pulse generator 25. Concurrently with progression of the trigger pulse of the shift register 26 through the stages thereof, the register stages each provide output signals which arrive, in the manner indicated in FIG. 3, at flip-flops 28 and upon their arrival set these flip-flops into the ON-condition.

Reset signals for the flip-flops 28 are obtained from a shift register 29 operated in parallel with shift register 26. This shift register is excited substantially concurrently with the shift register 26 by the output of the pulse generator 25, however progressed at a timing which has a significantly higher frequency than the progressing timing for the shift register 26.

The shift register 26 has a number of stages in correspondence with the number of pulses used for approximating a period of a sinusoidal current on one of lines 15, 16, 17, i.e. eight stages in the present example, for which reason the progressing timing of the pulse multiplier 27 is the eightfold of the timing at the output of the pulse generator 25.

The shift register 29 has a number of stage groups corresponding to the number of stages of the shift register 26, however, within each stage group, has a number of single stages in correspondence with the number of pulses of different pulse lengths, which is desirable or required for approximating the sinusoidal current oscillation on one of lines 15, 16 and 17 within a pulse sequence of eight pulses in correspondence with a period of this sinusoidal oscillation. In the present case merely three different pulse time lengths were selected. Accordingly, the shift register 29 altogether has twenty-four stages grouped into eight register stage groups. The progressing clock frequency of the shift register 29 is the twenty-four-fold of the output pulse-repetition frequency of the pulse generator 25, for which purpose a pulse multiplier 27a triples the pulse-repetition frequency at the output of the pulse multiplier 27.

It can thus be seen that the excitation pulses for the shift register 26 and 29, which are derived from the output of the pulse generator 25, pass through these registers in identical time periods owing to the different clock frequencies.

The reset signals for the flip-flop circuits 28 are now derived from register stage groups of register 29 (corresponding to certain ones of the register stages of register 26), so that switching pulses having a modulated time pulse width capable of being combined on an output line of the pulse generator unit 13 are obtained at the outputs of the flip-flop circuits 28. Other groups of actuating signals and reset signals for other groups of flip-flop circuits result in switching pulse sequences having, for example, a relative phase shift of 120° with the above described sequence of pulses of different time lengths, such that the stator windings of the synchronous motor 4 supplied at a phase shift of 120 electrical degrees are capable of generating a rotary magnetic field having good homogeneity.

It should be noted that the respective phase shifts of the switching pulse sequences for the inputs of the DC/AC converter 14 allocated to the single conductors of the stator winding are readily maintained without any additional control intervention when the pulse-repetition frequency of the pulse generator 25 is modified in the case of the embodiment according to FIG. 3. Tapping the reset signal for the flip-flop circuits 28 of single register stages of the shift register 29 at the beginning, middle or end of groups determines the relative pulse length in time independently of the output frequency of the pulse generator 25.

The representation of FIG. 4 shows, drawn apart in the axial direction, a synchronous motor 4 having a stator divided in two in the axial direction, which comprises stator parts 30a and 30b. The stator parts 30a and 30b each contain an annular yoke and polepieces projecting therefrom in the axial direction, opposing each other, having the shape of a circle ring sector in a radial section, which are each surrounded, as is, however, not represented in FIG. 4, by attached flat coils whose coil openings have the shape of a circle ring sector in a radial section.

Between the stator parts 30a and 30b there is the magnet wheel 18 of the synchronous motor 4 seated on the motor shaft 31 and having a permanent magnet 32 magnetised in a suitable manner and extending through the magnet wheel, which may be comprised of ferritic material.

The arrangement of the poles of stator parts 30a and 30b projecting toward the magnet wheel 18 and of the magnet wheel 18 itself can be taken from the front view in accordance with FIG. 6. In contrast with the customary orientation of the pole centre axes of three-phase stator pole arrangements of synchronous machines, in the embodiment in accordance with FIGS. 4 and 6 a stator pole configuration was chosen wherein the single poles have a geometrical orientation at 0°, 60°, 180° and 240° with respect to the axis of the motor shaft 31. Additional customary polepieces provided for a stator winding having a number 2 of pole pairs of in the geometrical positions of 120° and 300° were omitted in the embodiment in accordance with FIGS. 4 and 6. The windings surrounding the polepieces in the 0°, 60°, 180° and 240° positions are excited by correspondingly controlling the DC/AC converter 14, which in this case comprises four output lines or four pairs of output lines, such that the stator arrangement consisting of stator parts 30a and 30b generates an intense and comparatively homogeneous rotary magnetic field in the space between the axially opposed polepieces. By omitting additional polepieces in the geometrical positions corresponding to 120° and 300°, it is achieved in the embodiment of a synchronous motor in accordance with FIGS. 4 and 6 that the motor has comparatively small dimensions in the distance A between the dash-colon-dash marking lines, i.e. it is long and slim, which is very expedient for mounting in particular drive systems, e.g. in automobiles.

FIG. 4a shows an embodiment of a synchronous motor modified in comparison with FIG. 4, comprising a stator divided in two in the axial direction, wherein the stator parts are again designated by 30a and 30b. Due to the drawn-apart representation in the axial direction, the stator parts 30a and 30b are at a great distance from the synchronous machine magnet wheel 18, however face it at a small distance with their polepieces having a ring sector-shaped radial section when the arrangement is telescoped as is indicated by arrows.

Other than in the embodiment according to FIG. 4, the stator parts 30a and 30b each comprise only one pair of mutually opposing polepieces having a circle ring sector-shaped radial section. The stator parts are shaped identically, however mounted around the axis 31 in an arrangement staggered by 60°. The stator windings allocated to the polepieces, or the pole pairs of the stator parts 30a and 30b of FIG. 4a, are excited in such a way that a rotary field entering into interaction with the synchronous machine magnet wheel 18 results, bringing about conditions similar to those described in connection with the embodiment according to FIGS. 4 and 6. The embodiment according to FIG. 4a, too, is characterised by a space-saving design (FIG. 6, dimension A) and has the advantage of simple and cost-efficient manufacture due to identical formation of the stator parts.

Instead of the synchronous magnet wheel 18, it is also possible to provide between the stator parts 30a and 30b an asynchronous motor cage rotor having a flat disk-shape outwardly corresponding to the shape of magnet wheel 18, wherein the short-circuiting rings of the cage rotor shown under 33 are formed relative to the motor shaft 31 by a hub on the one hand and by an outer ring of spokes on the other hand, and the intermediate, radially extending spokes forming the rotor bars of the cage rotor.

Where asynchronous motors, the stator windings of which are actuated by a pulse generator unit 13, are used in electrical drive systems of the type considered here, the speed-torque characteristic of asynchronous machines necessitates carrying out speed control for some drive units, whereas in the case of using synchronous motors as drive motors, a pure rotary speed control by controlling the rotary speed of the rotary magnetic field of the stators may be performed, inasmuch as the rotary speed of the magnet wheel always has to be synchronous with the rotation of the rotary field.

As is indicated in FIG. 5 in a purely schematic manner, in speed control of the asynchronous motors to be used, a motor-speed actual-value sensor 34, for example an electro-optical synchro, an inductive synchro or a capacitive synchro is provided, whose actual-value signals for the rotary speed are retransmitted to the pulser 25 for completion of a control loop. It is also possible to interpret voltages induced in stator winding parts that are not subjected to pulses, as rotary-speed actual-value signals and return them to the pulser 25 for the purpose of speed control. Speed control, in particular for the realisation of a particular starting behavior, is performed in such a way that-depending on a desired rotary speed or a rotary speed to be attained-specific speed-torque characteristics of the asynchronous motor subjected to a varying frequency are selected by determining a specific rotary frequency of the rotary magnetic field generated in the stator, such that for example by starting out from the static torque a respective characteristic is made to become effective which causes a rise or decrease or maintenance of a particular driving speed.

There is finally the possibility in accordance with FIG. 7 of providing a synchronous motor 4 with a stator 35 on which conductor bars 36 extending in the axial direction are arranged in distribution over the inner periphery, for which purpose corresponding grooves are provided in the core assembly of the stator. The single conductor bars 36 are connected to a common return line on the side of the stator 35 located behind the plane of drawing of FIG. 7, and on the side of the stator 35 facing the viewer in the manner shown in FIG. 7 they are each connected to electronic changeover switches 37 which perform connection of single conductor bars 36 either to the line 11 conducting a positive potential or to the line 12 conducting a negative potential. The switch positions of the electronic changeover switches 37 are capable of being set, by switching signals from the single stages of a register 38, from the currently provided switching condition into the respective other switching condition, with conductor bars 36 diametrically opposed in the stator 35 concurrently being subjected to being changed in the manner indicated in FIG. 7.

By controlling the clock frequency for progressing of the register 38 by means of the clock pulse generator 39, a rotary magnetic field having a specific rotary speed is generated by the conductor bars 36 altogether owing to the direction of a respective flow of current, with this rotary field entering into interaction with the magnet wheel 18. The drive according to FIG. 7 thus realises a rotary stepping motor having a comparatively simple design.

Essential advantages of the presently disclosed drive system become apparent in the case that the AC motors, at least a superior number thereof, are actuating motors of comparatively smaller power and are used for effecting actuating movements of driven devices temporarily, whereby a high driving efficiency is not of significant importance. The power demand of the driven devices can be remarkably different as may be the required rotation speed from driven unit to driven unit. Such circumstances apply with vehicles, e.g. automobiles having driven devices in form of window closers, motor driven antennas, blowers for air conditioners, wind screen wipers, seat position adjusting means and the like. Also with aircrafts a multitude of actuating means is provided, used e.g. for control surface positioning or for some valve actuators.

The presently disclosed electric drive system allows to provide the total conductor network for supplying electric energy to the AC motors in a simple manner with a few conductor wires and to use this conductor network simultaneously for feeding the control pulses, whereby, at the location of the respective AC motor, there are provided identic, universally usable control signal receivers which facilitate stock-keeping, assembling and, particularly, ensures a trouble free structure to a high extent.

The total conductor network can be provided with electromagnetic shielding means in such manner that neither electromagnetic interferences can penetrate from the conductor system to other systems nor interferences from the environment are able to take influence on the operation of the presently disclosed electric drive system.

Since cable harnesses for feeding control signals to the respective devices to be driven and to the driving AC motors, respectively, are not necessary, the obtained saving can be used for installing multiple conductors which enable a redundant operation, e.g. on all vehicles requiring an increased reliability.

Finally it has to be noted that, within the presently disclosed electric drive systems, AC motors of different types can be used in one and the same system without the necessity of varying the basic structure of the control circuits. It should be mentioned in-this connection that e.g. a pulse generator unit of the kind described above could be used for controlling AC motors of different pole numbers of the stator winding.

What is claimed is:

1. Electrical drive system comprising a plurality of differently located AC motors having no slip rings and no commutator, the stator of said motors being designed in such manner that it is adapted to generate a magnetic rotating field, comprising further an electrical conductor network for feeding electrical energy from a current source to the AC motors and comprising a control system which includes control units allocated to the respective AC motors, characterized in that the control system comprises a central control station coupled with the electrical conductor network for generating of coded control signals, as well as control signal receivers located with the respective AC motors, said control signal receivers respectively comprising a decoder and a pulse generator unit, said pulse generator unit feeding pulses to the stator winding of the respective AC motor, the relative phase position of said pulses being controllable by said control signals of said central control station fed to said pulse generator unit in such manner that the rotating speed of the rotating field is controllable.

2. Electrical drive system in accordance with claim 1, characterized in that the pulses provided by said pulse generator unit are adjustable as regards their relative phase position as well as their duration by means of control signals of said central control station fed to said pulse generator unit.

3. Electrical drive system in accordance with claim 2 characterized in that said control signals provided by said central control station are coupled to said electrical conductor network via a multiplexer and encoder, and that said pulse generator unit receives input from a demultiplexer and decoder.

4. Electrical drive system in accordance with claim 1, characterized in that said control signals provided by said central control station are coupled to said electrical conductor network via a multiplexer and encoder, and that said pulse generator unit receives input from a demultiplexer and decoder.

5. Electrical drive system in accordance with claim 1, characterized in that at least one of said AC motors is a synchronous motor.

6. Electrical drive system in accordance with claim 5, characterized in that said stator winding of said AC motor comprises axially extending conductor rods evenly distributed at the circumference, one group of said conductor rods located on one side of the stator being connectable to a DC potential of one polarity and the opposite group of conductor rods being connectable to a DC potential of the opposite polarity, and in that diametrically opposite conductor rods, as regards their connection to different potential, can be interchanged advancing in circumferential direction in such manner that a synchronous motor magnet wheel allocated to said stator is pulled synchronously by the magnet field generated by the conductor rods fed with current and advancing in rotational direction.

7. Electrical drive system in accordance with claim 5 characterized in that at least one of said AC motors is an asynchronous motor.

8. Electrical drive system in accordance with claim 1, characterized in that at least one of said AC motors in an asynchronous motor.

9. Electrical drive system in accordance with claim 1, characterized in that it comprises, as units to be driven by said AC motors, devices of a vehicle as window closers, motor driven antennas, blowers, windscreen wipers, seat position adjusting means, control service actuators, and valve actuators.

10. Electrical drive system in accordance with one of the claims 1, 2, 3 or 6, characterized in that said current source is an AC source and that, at the location of the respective AC motors, there is provided a rectifier circuit for feeding a rectifier inverter connected to the stator winding of the respective AC motor.

11. Electrical drive system in accordance with one of the claims 1, 2, 3 or 10, characterized in that said current source is a DC source, the voltage of which is fed to a rectifier inverter controlled by said pulse generator unit and located with the respective AC motor.

12. Electrical drive system in accordance with one of the claims 1, 2, 3 or 10, characterized in that each pulse generator unit, in dependence from control signals determining the rotation speed of the rotating magnetic field of the stator winding of the respective AC motor, feeds to a or the rectifier inverter a number of pulse sequences corresponding to the number of phases of the stator winding, said pulse sequences, in relation to each other, are electrically phase shifted corresponding to the geometric position of the phase coils of the stator winding, whereby the temporal pulse lengths within the pulse sequences are modulated for approximation of the respective phase current in correspondence with the time integral over the pulse sequence on the basis of the respective DC mean value to a sinusoidal current characteristic in the respective phase coil.

13. Electrical drive system in accordance with claim 5 or 8, characterized in that said stator is formed of two stator parts having axial distance from each other, said stator parts having poles being entwined by said phase windings and extending in axial direction and protruding from respective stator yoke parts, said poles being opposite to each other or being staggered in relation to each other in circumferential direction and, between them, defining a comparatively flat cylindrical gap, a magnet wheel of the synchronous motor or a short circuit rotor of the asynchronous motor being rotatably supported on a motor shaft extending through said stator parts in axial direction.

* * * * *